July 22, 1930.  G. L. CHERRY  1,770,969
METHOD OF AND APPARATUS FOR SHEATHING CORES
Filed Dec. 19, 1928
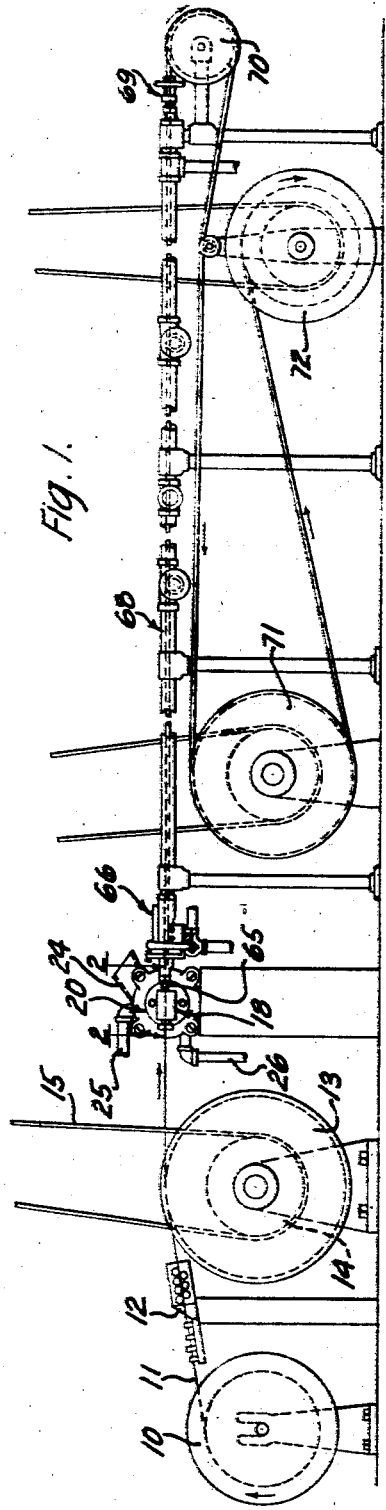
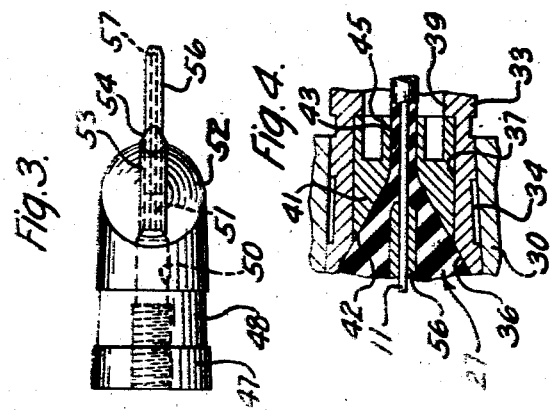
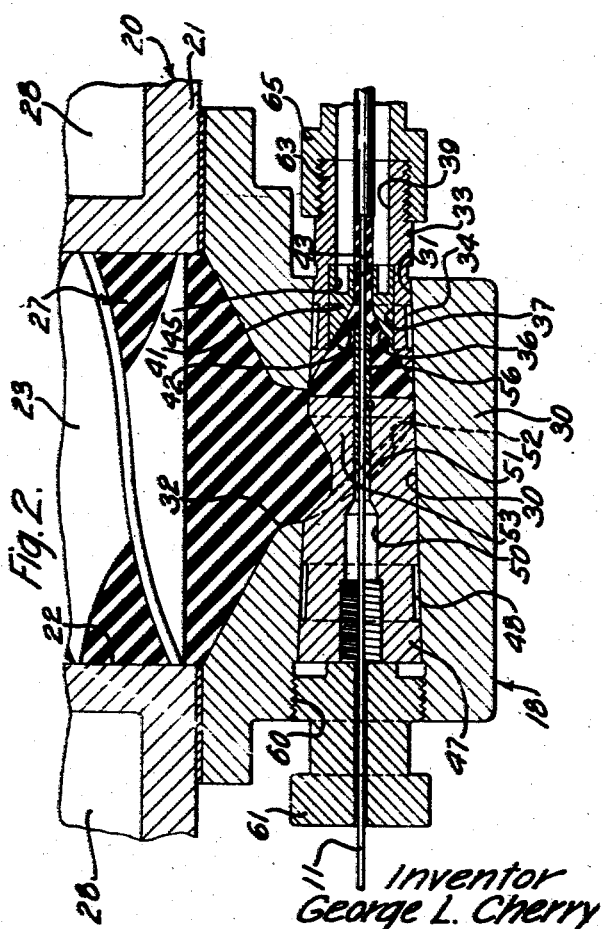
Inventor
George L. Cherry Patented July 22, 1930

1,770,969

UNITED STATES PATENT OFFICE

GEORGE LAFAYETTE CHERRY, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR SHEATHING CORES

Application filed December 19, 1928. Serial No. 327,028.

This invention relates generally to methods of and apparatus for sheathing cores, and more particularly to methods and apparatus for insulating electrical conductors.

The objects of the invention are to provide simple, economical and effective methods of and apparatus for sheathing cores.

According to the general features of the invention a strand of material to be sheathed, such as a wire or cable, is passed from a supply reel through an extrusion mechanism provided with an extrusion head having a recessed heat conducting die therein through which the strand passes, which extrusion mechanism forms a coating of unvulcanized insulating material upon this strand as it emerges therefrom. Connected to the extruding mechanism is a vulcanizing chamber into which the coated strand passes directly without access to the atmosphere and in which the insulating material is subjected to sufficient heat and pressure to vulcanize it, a portion of the vulcanizing material entering the recess in the die to heat the same and to increase the plasticity of the insulating material being extruded therefrom. The strand covered with a vulcanized insulating coating emerges from the vulcanizing chamber through the seal which tends to maintain the pressure within the chamber, and is wound upon a storage reel where it may remain until used.

The invention will be clearly understood from the following detailed description and the accompanying drawing, in which Fig. 1 is a side elevation of an apparatus for sheathing cores embodying the invention and which may be employed to practice a method embodying the invention;

Fig. 2 is an enlarged horizontal sectional view of an extrusion mechanism taken substantially on line 2—2 of Fig. 1;

Fig. 3 is an enlarged detailed view of a part of the extrusion head, and

Fig. 4 is an enlarged fragmentary horizontal sectional view of a portion of the extrusion mechanism illustrated in Fig. 2.

Referring now to the drawing, in which like numerals designate like parts throughout the several views, one embodiment of the invention is illustrated which is adapted to cover a wire with an electrical insulating cover of rubber. The apparatus is provided with a supply reel 10 from which a wire 11, which is to be insulated, is drawn through a wire straightening device 12 of any desired form by means of a capstan 13 around which the wire passes and which is driven through a pulley 14 by means of a belt 15 connected to a suitable source of power (not shown), at a speed slightly greater than that of the wire in order to relieve the wire of tension during its passage through the members hereinafter described. From the capstan the wire passes through a head 18 of an extrusion mechanism 20, which is designed to extrude a uniform coating of an unvulcanized insulating material such as a suitable rubber compound on the wire as it emerges from the head 18.

The extrusion mechanism 20 comprises a jacketed body portion 21 provided with a central opening 22 (Fig. 2) in which operates a conveying screw 23 driven in any suitable manner, a hopper 24 serving to supply insulating material 27 from the exterior of the extruding mechanism to the central passage 22. Suitable connections 25 and 26 leading to and from a constant temperature device of any suitable form (not shown) are provided to convey a heated fluid into channels 28—28 formed in the body portion 21 to maintain the material to be extruded at an optimum extruding temperature. The head 18 consists of body portion 30 which is provided with a tapered central passage 31 and an inlet passage 32 at right angles thereto, which connects the tapered passage 31 with the passage 22 in the body portion 21. A removable, tapered, self-centering die holder 33 having a peripheral groove 34 formed therein is designed to fit closely within the smaller end of the tapered passage 31, and is provided at its larger end with a conical-shaped opening 36 leading into a smaller central cylindrical opening 37, which in turn connects with a still smaller central cylindrical opening 39. Positioned within the cylindrical opening 37 in the die holder 33 is a removable die 41 having a conical opening 42 formed in the inner end thereof, which is designed to align with the conical opening 36 in the die holder 33 when the die 41 is positioned in the die holder, and which leads into a small central cylindrical opening 43 having a diameter substantially that desired in the coating to be extruded upon the wire. The die 41 is also provided with a circular recess 45 in the outer end thereof which surrounds the opening 43 and communicates with the cylindrical opening 39 in the die holder 33.

A removable tapered hollow core tube 47 having a circular peripheral groove 48 formed therein is designed to fit closely within the larger end of the tapered passage 31, and is provided with a central passage 50, the outer end of which is threaded, and which connects at its inner end with a smaller central passage 51 through which passages the wire 11 passes from the exterior of the head 18. The forward end of the core tube 47 is provided with an inclined or curved surface 52 (Fig. 3) designed to direct the material to be extruded toward the die 41 and a fin or partition 53 is provided to divide the stream of insulating material passing thereby into two portions in order to distribute the material evenly upon the surface 52. The fin 53 is provided with a beveled end 54 to reduce friction and to more evenly distribute the insulating material and a small tube 56 having a central opening 57 only slightly larger than the wire 11 formed therein extends into the central opening 51 in the core tube 47 in alignment with the fin 53. The rearward end of the tapered passage 31 ends in a threaded enlargement 60, into which a hollow threaded plug 61 may be inserted to force the core tube 47 tightly into the tapered opening 31.

The outer end of the die holder 33 extends exteriorly of the head 18 forming a nozzle portion 63, and the end of this portion is threaded so that a connecting fixture 65 may be secured thereon to join the same with a connecting member 66, such as that described in the copending application Serial No. 223,589, filed October 3, 1927 by R. C. Kivley, which effects a pressure-tight connection between the extrusion mechanism 20 and a vulcanizing chamber 68 into which chamber a heated non-oxidizing vulcanizing medium, such as steam, is introduced under pressure to completely vulcanize the insulating material forming a coating upon the wire. The wire passes through the above described members of the apparatus and emerges from the vulcanizing tube 68 through the seal 69 which may be of any suitable type, such as that described in the United States Patent No. 1,689,205, granted October 30, 1928, to L. F. Lamplough, which prevents the escape of more than a predetermined amount of the vulcanizing medium from the interior of the vulcanizing chamber, after which the wire is drawn over a sheave 70 by means of a capstan 71, and is wound around a take-up reel 72, where it may be stored until used.

The operation of the device is as follows: The end of the uncovered wire 11 is threaded through the wire straightening device 12, is passed around the capstan 13, through the head 18 of the extrusion device, through the connecting member 66, the vulcanizing tube 68, and the seal 69, around the sheave 70 and capstan 71, and on to the take-up reel 72. Heat is then applied to the exterior of the body portion 30 of the extrusion head 18 in any suitable manner, such as by means of a gas flame or an electrical heating plate, to initially bring the die 41 and related parts to the optimum extrusion temperature, after which power is applied to the various driving members, a quantity of unvulcanized insulating material, such as a rubber compound, is inserted into the passage 22 of the extruding head through the hopper 24, and a hot vulcanizing medium, such as steam, is introduced into the vulcanizing chamber 68. The conveying screw 23 forces a stream of the insulating material 27 under high pressure past the fin 53 which divides the stream of material into two portions, thereby distributing it evenly around the tube 56 and against the curved surface 52, which deflects the material toward the die 41. The insulating material is forced by the pressure of the screw through the small central opening 43 of the die and forms a compact uniform coating around the wire 11 as the wire passes therethrough. The coated wire continues through the vulcanizing chamber 68, wherein it is subjected to a vulcanizing temperature and pressure, and by the time the wire emerges through the seal 69, the insulating coating on the wire is completely vulcanized. After the insulated wire emerges from the seal 69 it passes over the capstan 71 and on to the take-up reel 72, where it may be stored until used, sufficient time elapsing during the travel of the wire around these members for the insulating material to cool.

The hot vulcanizing medium introduced into the vulcanizing chamber 68 may readily pass through the connecting member 66 and into the openings 39 and 45 in the die holder 33 and 41 respectively, and impart a portion of its heat content to the die 41 so that after the apparatus has been in operation for a sufficient length of time to permit the various parts to reach a state of equilibrium, sufficient heat is introduced into the extrusion head 18 to permit the withdrawal of the exterior heating means and the apparatus will continue to operate without the application of any external heat. Since the recess 45 is in close proximity to the surfaces 42 and 43 on the interior of the die 41, which surfaces constitute the extrusion surfaces of the apparatus, the hot vulcanizing medium may come into close proximity of the surfaces and supply heat thereto, and thereby increase the plasticity of the insulating material so that it may be more readily extruded. Since the surfaces 42 and 43 are maintained at a comparatively high temperature by the heat transmitted from the vulcanizing medium, these surfaces effect what may be termed an "ironing" action upon the extrusion material, as a result of which the exterior surface of the extruded sheath is smooth and uniform.

What is claimed is:

1. The method of sheathing cores, which consists in extruding a coating of a vulcanizable material around a core, advancing the sheathed core into a hot vulcanizing medium without access to the air, and utilizing a portion of the heat from the hot vulcanizing medium to render the vulcanizable material more plastic during the extrusion thereof.

2. The method of sheathing cores, which consists in advancing the core through a pressure zone to extrude a coating of vulcanizable material around the core, advancing the sheathed core directly into a hot vulcanizing medium, and conveying a portion of the hot vulcanizing medium into close proximity to the pressure zone to increase the plasticity of the vulcanizable material during the extrusion thereof.

3. The method of insulating electrical conductors, which consists in extruding a coating of a vulcanizable rubber compound around a conductor, advancing the thus sheathed conductor directly into steam under pressure, and utilizing a portion of the heat from the steam to increase the plasticity of the rubber compound during the extrusion thereof.

4. In a core sheathing device, means for applying sheathing material upon a core, a vulcanizing chamber connected in fluid-tight relation to the material applying means, and means for conveying a portion of the hot vulcanizing medium into heat conducting relation with the material applying means.

5. In a core sheathing device, a vulcanizing chamber for containing a hot vulcanizing medium, and an extrusion mechanism connected in fluid-tight relation thereto, said extrusion mechanism including a removable die holder, and a removable die positioned in the die holder having an extruding opening therethrough and a recess closely adjacent the extruding opening for containing a portion of the hot vulcanizing medium to supply heat to the die.

6. In a core sheathing device, a vulcanizing chamber for containing a hot vulcanizing medium under pressure, and an extrusion mechanism connected in fluid-tight relation thereto, said mechanism including a removable self-centering die holder, and a removable die positioned therein having a central funnel-shaped extruding opening therethrough and a circular recess surrounding the exit end of the extruding opening for holding a portion of the hot vulcanizing medium in heat conducting relation therewith.

7. In a core sheathing device, a vulcanizing chamber for containing a hot vulcanizing medium under pressure, an extrusion mechanism including a die holder having a nozzle extending from the outer end thereof, and a die positioned in the die holder having a central extrusion opening and a recess surrounding the extrusion opening and in communication with the nozzle portion of the die holder, and means for effecting a fluid-tight connection between the vulcanizing chamber and the nozzle of the die holder whereby a portion of the hot vulcanizing medium is conveyed into close proximity to the extruding opening of the die to heat material extruded therethrough.

8. In a core sheathing device, an extrusion mechanism for applying a vulcanizable insulating material upon a core, and a vulcanizing chamber connected in fluid-tight relation thereto and designed to contain a hot vulcanizing medium under pressure, said extrusion mechanism including a recessed die holder in direct communication with the vulcanizing medium in the vulcanizing chamber, and a die having a central extruding surface and a recess extending in close proximity to the extruding surface and in communication with the recess in the die holder for conveying a portion of the hot vulcanizing medium into heat conducting relation with the extruding surface of the die.

9. In a core sheathing device, a vulcanizing chamber for containing a hot vulcanizing medium under pressure, and an extrusion mechanism connected in fluid-tight relation thereto including a die holder provided with a central opening having a conical inner end, and a removable die positioned therein having a conical opening in alignment with the conical portion of the die holder opening and a cylindrical extrusion opening communicating therewith, and provided with a recess surrounding the extrusion opening for holding a portion of the hot vulcanizing medium to heat the die.

10. In a core sheathing device, a vulcanizing chamber for containing steam under pressure, an extrusion mechanism for applying a sheathing of vulcanizable rubber compound upon the core, said sheathing mechanism including a removable self-centering die holder having a nozzle portion extending from the outer end thereof, and a die positioned in the die holder having a funnel-shaped extrusion opening therethrough and a circular recess in the outer end thereof surrounding the exit end of the extrusion opening and in communication with the nozzle portion of the die holder, and means for effecting a pressure-tight connection between the vulcanizing chamber and the nozzle portion of the die holder, whereby a portion of the steam in the vulcanizing chamber is conveyed into close proximity to the extrusion opening of the die to heat material extruded therethrough.

In witness whereof, I hereunto subscribe my name this 8th day of December A. D., 1928.

GEORGE LAFAYETTE CHERRY.